Patented Apr. 2, 1940

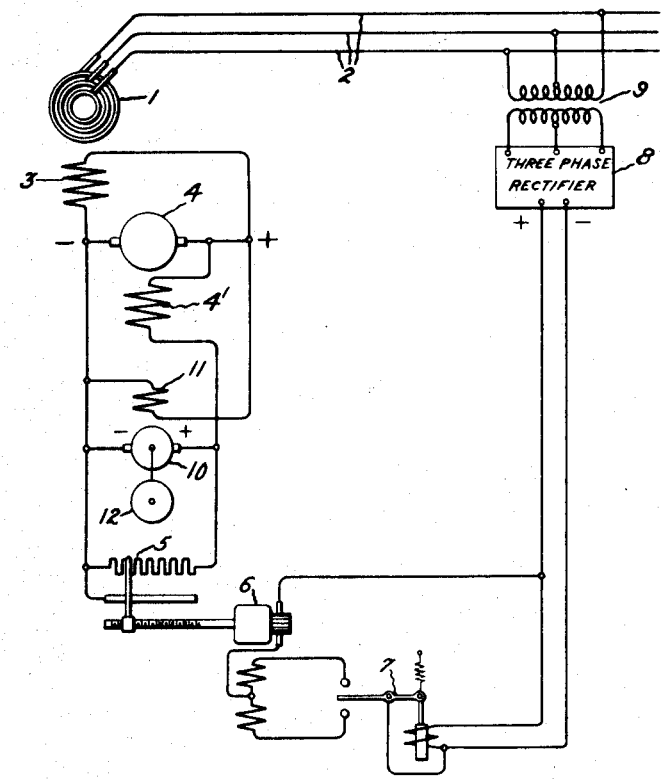

2,196,041

UNITED STATES PATENT OFFICE 2,196,041

ELECTRICAL REGULATION

Louis W. Thompson, Schenectady, N. Y., assignor to General Electric Company, a corporation of New York Application August 10, 1937, Serial No. 158,303

8 Claims. (Cl. 171—224)

My invention relates to electrical regulators and regulating systems and it has for its principal object the stabilization of the voltage of rheostatically controlled self-excited dynamoelectric machines, especially shunt connected direct current exciters.

Assuming other conditions of operation constant, every dynamo-electric generator has a given characteristic curve of armature voltage compared with field current. This curve corresponds to the magnetization curve of the magnetic circuit of the generator. Shunt field current, however, is dependent on the resistance of its circuit as well as upon the generator voltage. Ordinary stable operation of shunt machines is at a point on the characteristic curve where the ratio of generator voltage to generator shunt field current equals the resistance of the generator shunt field circuit. However, the voltage characteristic of most generators is such that at the lower values of voltage it is almost a straight line passing through the origin of coordinates so that over a considerable range of terminal voltages and field current the ratio of voltage to current is substantially constant. This means that when the generator shunt field circuit has a resistance having this constant ratio, the voltage of the generator is unstable and it may have any value over this constant ratio range.

In accordance with my invention, I stabilize the voltage of a shunt-excited generator by means of an auxiliary dynamo-electric machine for inserting an automatically variable potential in the shunt field circuit. This potential acts to oppose any change in field current at any particular setting of field resistance and, therefore, permits stable operation of the generator at values of field circuit resistance which otherwise would cause voltage instability.

An object of my invention is to provide a new and improved generator voltage regulating circuit.

Another object of my invention is to provide a new and improved arrangement for stabilizing the voltage of shunt-excited generators.

Another object of my invention is to provide a new and improved automatic dynamo-electric machine regulating system.

My invention will be better understood from the following description taken in connection with the accompanying drawing and its scope will be pointed out in the appended claims.

Referring now to the single figure of the accompanying drawing, which illustrates diagrammatically an embodiment of my invention, I show therein by way of example a main alternating current machine 1 connected to a power circuit 2. Machine 1 may for example be a three-phase synchronous generator. This machine is provided with a field winding 3 energized by a direct current self-excited generator 4 having a shunt field winding 4' in series with which is connected an adjustable regulating rheostat 5. Rheostat 5 may be manually operated if desired but as shown it is automatically operated in response to the voltage of the maincircuit 2 by means of a reversible servomotor 6 whose direction of operation is controlled by any suitable voltage sensitive controller, such as a contact-making voltmeter 7. Both the motor 6 and the meter 7 are connected to respond to the voltage of all of the phases of the circuit 2 by means of a suitable three-phase rectifier 8 energized by the line to line voltages of the circuit 2 through potential transformers 9.

In order to stabilize the voltage of exciter 4, I connect the armature of an auxiliary direct current dynamo 10 across the rheostat 5. This auxiliary machine has a field winding 11 which is connected to respond to the voltage of exciter 4, as by connecting it directly across the terminals thereof. The machine 10 which may also be termed a counter E. M. F. generator or motor is free to rotate at any speed and is not mechanically connected to the main generator 1 or to the exciter 4. In order to provide a forcing action by the regulating system as a whole and also in order to provide an anti-hunting effect, the armature of machine 10 is given an abnormally high moment of inertia by any suitable means such as providing it with a fly-wheel 12. This will be explained further on.

Although machine 4 is referred to as an exciter it is of course also a shunt-connected direct-current generator which is suitable for general purpose operation.

The way the voltage of generator 4 is stabilized by means of the counter E. M. F. machine 10 is as follows. Assume machines 1 and 4 are being driven at constant speed by any suitable means (not shown). With the rheostat 5 set in any given position, such as the illustrated position, the voltage of the generator 4 will be determined primarily by the setting of the rheostat. The counter E. M. F. machine 10 will be energized by a voltage which equals the voltage drop through the effective portion of the regulating rheostat 5 and as the machine 10 is free to rotate at any speed it will inherently reach a steady state condition at which it will operate as a motor. The energy that it takes to run it will be relatively small as it is of relatively small size and drives no load.

If now the rheostat 5 is moved so as to decrease its effective resistance, that is to say if its slider is moved to the right so as to short-circuit a greater portion of the resistance, the current in the exciter field winding 4' will increase thereby increasing the voltage of the generator 4. However, an increased voltage across the terminals of generator 4 increases the current in the field winding 11 of the counter E. M. F. machine 10 which, due to its characteristics tends momentarily to keep rotating at substantially the same speed. Consequently the counter E. M. F. generated in the armature 10 of the auxiliary machine increases and this opposes a change in current in the field winding 4'. After a time, machine 10 reaches a new steady state condition of operation corresponding to the new voltage drop across the regulating rheostat and to the higher voltage of the generator 4. Similarly if the rheostat arm is moved to the left so as to increase the effective resistance of the rheostat the current in the field winding of the generator 4 decreases thereby decreasing the generator voltage. However a decrease in voltage across the terminals of the generator 4 decreases the current in the field winding 11 of the auxiliary machine thereby decreasing the counter E. M. F. generated by this machine and opposing the decrease in current in the field winding of the main generator 4. However, this action will soon settle down to a steady state value at the new value of voltage of generator 4. It will thus seem that counter E. M. F. machine 10 is an electro-mechanical damping device for retarding change in exciter voltage.

If now rheostat 5 is moved to cut in still more resistance until the zone of ordinary unstable voltage operation is reached voltage instability will be prevented because whenever the voltage of generator 4 starts to rise, the counter electromotive force of the machine 10 also increases due to the increase in the energization of its field winding 11 thereby bucking down an increased field current in the generator 4 and preventing further rise in voltage. Similarly, if the voltage of generator 4 tends to fall the field 10 of the auxiliary machine is weakened thereby weakening the counter E. M. F. developed by this machine and in turn preventing the field current of the generator 4 from falling in response to the decrease in terminal voltage of the machine. As a result there may be relatively slight oscillations in the magnitude of the counter E. M. F. generated in the machine 10 when the rheostat 5 is holding a value of resistance normally tending to cause instability. However the voltage of generator 4 will be substantially constant and there will be a definite value of voltage for each different position of the rheostat 4.

In the automatic operation of the regulating system the contact-making voltmeter 7 will be balanced in its illustrated mid-position if normal voltage exists on circuit 2. If the voltage falls the moving contact of the voltmeter engages its uppermost fixed contact thereby completing an energizing circuit for the motor 6 and causing the rheostat to decrease its resistance and thus raise the exciter voltage and consequently the voltage of the main alternator 1. Similarly if the voltage of the main circuit rises the contact-making voltmeter closes its other set of contacts thereby reversing the motor 6 and causing the rheostat to increase its resistance thereby to decrease the excitation and voltage of the dynamo-electric machines 4 and 1.

Sometimes regulating rheostats have maximum values of resistance which are so high as to prevent a self-excited generator from building up voltage. However, with my arrangement this cannot happen because the armature resistance of the auxiliary machine 10 is always very low so that when the machine 4 is at rest the rheostat is substantially short circuited no matter what its resistance value is. Consequently, current will always build up in the field 4' due to residual magnetism in the main machine and as soon as the counter E. M. F. machine comes up to speed its counter E. M. F. will hold the field current substantially constant at a value determined by the setting of the rheostat.

In some regulating systems, such as the one illustrated in the drawing, the motor for operating the rheostat is energized from the main power circuit. If now there should be a failure of power to the motor 6, as by a break in the connections or an opening of a circuit breaker at a time when the resistance of the rheostat 5 is a maximum an ordinary regulating system of this type might not build up again when the system is again started. However, as previously explained the presence of my counter E. M. F. machine 10 always insures that the voltage of the exciter will build up.

The presence of the flywheel 12 causes a desirable field forcing and anti-hunting action as follows: The flywheel retards the acceleration of the counter E. M. F. machine 10 thus allowing the exciter voltage to go slightly beyond the point to which it would otherwise go. As the motor comes up to speed the exciter voltage backs down which gives an inherent anti-hunting action. In other words, the counter E. M. F. of the machine 10 is proportional to the product of its speed and field current and the flywheel retards the rate of change of its speed. Therefore, it takes longer to settle down to a steady state value after each change in setting of the rheostat and this permits a forcing or over-shooting of the field excitation of the generator 4 with a later backing off and settling down of this voltage to its normal steady state value.

While I have shown and described a particular embodiment of my invention, it will be obvious to those skilled in the art that changes and modifications can be made without departing from my invention and I, therefore, aim in the appended claims to cover all such changes and modifications as fall within the true spirit and scope of my invention.

What I claim as new and desire to secure by Letters Patent of the United States is:

1. In combination, a generator having a direct current shunt field winding, a rheostat in series with said field winding, said rheostat being arranged to operate continuously at adjustable resistance values high enough normally to cause voltage instability of said generator, and means for inserting a variable potential in circuit with said field winding of such magnitude and direction as to oppose current changes in said shunt field winding circuit thereby to stabilize the voltage of said generator at any setting of said rheostat, said means being automatically responsive to changes in voltage of said generator.

2. In combination, a direct current generator having a shunt field winding, a rheostat in series with said field winding, said rheostat being arranged to operate continuously at adjustable resistance values high enough normally to cause voltage instability of said generator, and means for inserting a variable counter electromotive force in circuit with said field winding of such magnitude as to oppose current changes in said field winding circuit thereby to stabilize the voltage of said generator at any setting of said rheostat, said means being automatically responsive to changes in voltage of said generator.

3. In combination, a self-excited direct current generator adapted for constant speed operation, a shunt field winding for said generator, a rheostat in series with said field winding, a direct current dynamo-electric machine having an armature which is connected in parallel with said rheostat, said armature being free to rotate independently of said generator, and a field winding for said dynamo-electric machine connected to be energized in accordance with the voltage of said generator.

4. In combination, a self-excited direct current exciter adapted for constant speed operation, a shunt field winding for said exciter, a rheostat in series with said field winding, a counter electromotive force machine having an armature which is connected in parallel with said rheostat, said armature being free to rotate independently of said exciter, and a field winding for said counter electromotive force machine connected across the terminals of said exciter.

5. In a regulator system for a main generator, the combination of a direct current exciter therefor, a field winding on said exciter, a rheostat in series with said shunt-field winding, a counter electromotive force dynamo having its armature connected in parallel with said rheostat, a field winding for said counter electromotive force dynamo connected to respond to the voltage of said exciter, said counter electromotive force dynamo being free to rotate at varying speeds relative to the speed of said generator and exciter, said counter electromotive force dynamo being provided with means for giving it an abnormally high moment of inertia, and means responsive to the voltage of said generator for adjusting said rheostat.

6. In combination, a main dynamo electric machine, a field winding on said machine connected to be energized in accordance with the voltage of said machine, a rheostat connected to control the voltage of said machine by controlling the current in said field winding, and an auxiliary dynamo-electric machine having a relatively low resistance armature which is connected directly across said rheostat for insuring self-excited voltage build-up of said main machine at any setting of said rheostat.

7. In combination, a self-excited dynamo-electric machine, means for controlling the excitation of said machine so as to vary the voltage thereof, said means having a plurality of settings which cause voltage instability of said machine, and electro-mechanical damping means connected to produce automatically in response to changes in the excitation of said machine counter effects for opposing said changes thereby to stabilize the voltage of said machine at any setting of said controlling means.

8. In combination, a self-excited constant-speed direct-current exciter for a main dynamo-electric machine, a shunt connected field winding for said exciter, a regulating rheostat connected in series with said winding, said rheostat having resistance values at the high resistance end of its range which are so high as normally to cause voltage instability of said exciter when it is operating with the rheostat adjusted within said high resistance range and to prevent self-excited voltage build-up of said exciter when it is started with the rheostat adjusted within said high resistance range, means for stabilizing the exciter voltage and permitting voltage build-up thereof when the rheostat is adjusted within said high resistance range comprising a freely-running direct-current dynamo-electric machine armature connected directly across said rheostat, a flywheel mounted on the shaft of said armature, and a field winding for said armature connected directly across the terminals of said exciter.

LOUIS W. THOMPSON.